(12) United States Patent
Smets et al.

(10) Patent No.: US 9,721,319 B2
(45) Date of Patent: Aug. 1, 2017

(54) TAP AND WIRELESS PAYMENT METHODS AND DEVICES

(75) Inventors: Patrik Smets, Nijlen (BE); David A. Roberts, Appleton (GB); Simon Phillips, York (GB); John Gaitanos, London (GB); Mehdi Collinge, Mont-Sainte-Aldegonde (BE); Jonathan James Main, Hook (GB)

(73) Assignee: MasterCard International Incorporated, Purchase, NY (US)

( * ) Notice: Subject to any disclaimer, the term of this patent is extended or adjusted under 35 U.S.C. 154(b) by 1120 days.

(21) Appl. No.: 13/432,778

(22) Filed: Mar. 28, 2012

(65) Prior Publication Data
US 2013/0097080 A1 Apr. 18, 2013

Related U.S. Application Data

(60) Provisional application No. 61/547,442, filed on Oct. 14, 2011.

(51) Int. Cl.
*G06Q 20/00* (2012.01)
*G06T 1/20* (2006.01)
*H04N 19/85* (2014.01)

(52) U.S. Cl.
CPC ............. *G06T 1/20* (2013.01); *H04N 19/85* (2014.11)

(58) Field of Classification Search
CPC ...................................... G06Q 20/12
USPC .......................................... 705/78
See application file for complete search history.

(56) References Cited

U.S. PATENT DOCUMENTS

| | | | | |
|---|---|---|---|---|
| 7,962,369 B2* | 6/2011 | Rosenberg | ............. | G06Q 20/20 705/26.1 |
| 2011/0047036 A1* | 2/2011 | Foran-Owens | ...... | G06Q 20/204 705/17 |

* cited by examiner

*Primary Examiner* — Edward Chang
(74) *Attorney, Agent, or Firm* — Buckley, Maschoff & Talwalkar LLC

(57) ABSTRACT

Example embodiments include methods and apparatus for exchanging, using a contactless interface included in a portable device, transaction information associated with an electronic merchant device when the portable device is brought into close proximity to a contactless interface associated with the electronic merchant device, with the information identifying the electronic merchant device and identifying a handover wireless network connected to the electronic merchant device and with information including security credentials required to form a secure connection, establishing a persistent, secure wireless connection with the electronic merchant device, using a wireless network interface in the portable device and the transaction information, over the handover wireless network and exchanging transaction messages between the portable device and the electronic merchant device over the persistent, secure wireless connection during a shopping interval.

36 Claims, 11 Drawing Sheets

TAP AND WIRELESS PAYMENT METHODS AND DEVICES

RELATED APPLICATIONS

This application claims priority from a provisional application entitled CONTACTLESS DEVICE PAYMENT METHODS AND SYSTEMS, Application No. 61/547,442 filed Oct. 14, 2011, which is hereby incorporated by reference for all purposes.

TECHNICAL FIELD

The present disclosure relates generally to techniques for allowing an ongoing feature-rich exchange between a portable device of a customer and point of sale equipment to enhance the customer's shopping experience.

BACKGROUND OF THE INVENTION

Payment cards such as credit or debit cards are ubiquitous and for decades such cards have included a magnetic stripe on which the relevant account number is stored. To consummate a purchase transaction with such a card, the card is swiped through a magnetic stripe reader that is part of the point of sale (POS) terminal. The reader reads the account number from the magnetic stripe. The account number is then used to route a transaction authorization request that is initiated by the POS terminal.

A prominent payment card system is operated by the assignee hereof, MasterCard International Incorporated, and by its member financial institutions. FIG. 1 schematically illustrates a typical transaction, as carried out in a payment system 100. To initiate the transaction, a customer (not shown) visits a retail store (not shown) operated by a merchant, selects goods (not shown) that he/she wishes to purchase, carries the goods to the merchant's point of sale equipment 104, and presents his/her payment card 102 to the point of sale equipment 104. The point of sale equipment 104 reads the customer's payment card account number from the payment card 102, and then sends an authorization request to an acquirer financial institution (FI) 106 with which the merchant has a relationship. The authorization request includes the payment card account number and the amount of the transaction, among other information. The authorization request is routed via a payment card system 108 (which may be, for example, the well-known Banknet system operated by the assignee hereof) to the issuer financial institution (FI) 110 that issued the customer's payment card 102. Arrows 112, 114 and 116 trace the path of the authorization request from the POS terminal 104 to the issuer 110.

Assuming that all is in order, the issuer FI 110 transmits a favorable authorization response to the point of sale equipment 104 through the payment card system 108 and via the acquirer FI 106. The path of the authorization response from the issuer FI 110 to the POS terminal 104 is traced by arrows 118, 120 and 122. The transaction at the point of sale equipment 104 is then completed and the customer leaves the store with the goods. A subsequent clearing transaction initiated by the merchant results in a transfer of the transaction amount from the customer's payment card account 124 to an account that belongs to the merchant. The customer's payment card account 124 may be, for example, either a debit card account or a credit card account. In the former case, the clearing transaction results in the funds being debited directly from the account 124. In the latter case, the clearing transaction results in a charge being posted against the account 124, and the charge subsequently appears on the customer's monthly credit card statement.

The foregoing description of the typical transaction may be considered to be somewhat simplified in some respects. For example, a merchant processing system (not shown) may be interposed between the POS terminal and the acquirer FI. As is familiar to those who are skilled in the art, a merchant processing system may be operated by or on behalf of the merchant to form part of the communications path between the acquirer FI and POS terminal operated by the merchant. It is also often the case that a third party transaction processing service may operate to handle payment card transactions on behalf of the acquirer and on behalf of a large number of other like financial institutions.

In pursuit of still greater convenience and more rapid transactions at the POS terminal, payment cards have more recently been developed that allow the account number to be automatically read from the card by radio frequency communication between the card and a proximity reader or terminal 126 which may be incorporated with the POS terminal 104. In such cards, often referred to as "proximity payment cards" or "contactless payment cards", a radio frequency identification (RFID) integrated circuit (IC) or tag 128 is embedded in the card body 102. A suitable antenna is also embedded in the card body and is connected to the RFID chip to allow the chip to receive and transmit data by RF communication via the antenna. In typical arrangements, the RFID chip 128 is powered by an RF interrogation signal that is transmitted by the proximity reader 126 and received by the card antenna.

MasterCard International Incorporated, the assignee hereof, has established a widely-used standard known as "PayPass" for interoperability of contactless payment cards and proximity readers.

In the PayPass system, at checkout a tiny microchip and a radio antenna embedded in a PayPass-enabled device wirelessly transmit payment details to a PayPass reader when the PayPass-enabled device is brought in close proximity ("tapped") to the reader. In the following data exchange, such as used in the PayPass system, will sometimes be referred to as "contactless". The reader on the POS terminal then verifies the transaction with the issuer FI through, for example, MasterCard's reliable network and indicates approval almost instantly.

The PayPass reader includes a keypad that allows a cardholder to enter a Personal Identification Number (PIN) used by the payment system to authenticate the cardholder.

The capabilities of a contactless payment card be incorporated into a mobile telephone, thereby turning the mobile telephone into a contactless payment device. Typically a mobile telephone/contactless payment device includes integrated circuitry with the same functionality as the RFID IC of a contactless payment card. In addition, the mobile telephone/contactless payment device includes a loop antenna that is coupled to the payment-related IC for use in sending and/or receiving messages in connection with a transaction that involves contactless payment.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and example embodiments and which are not necessarily drawn to scale, wherein.

OVERVIEW

Figure 1:
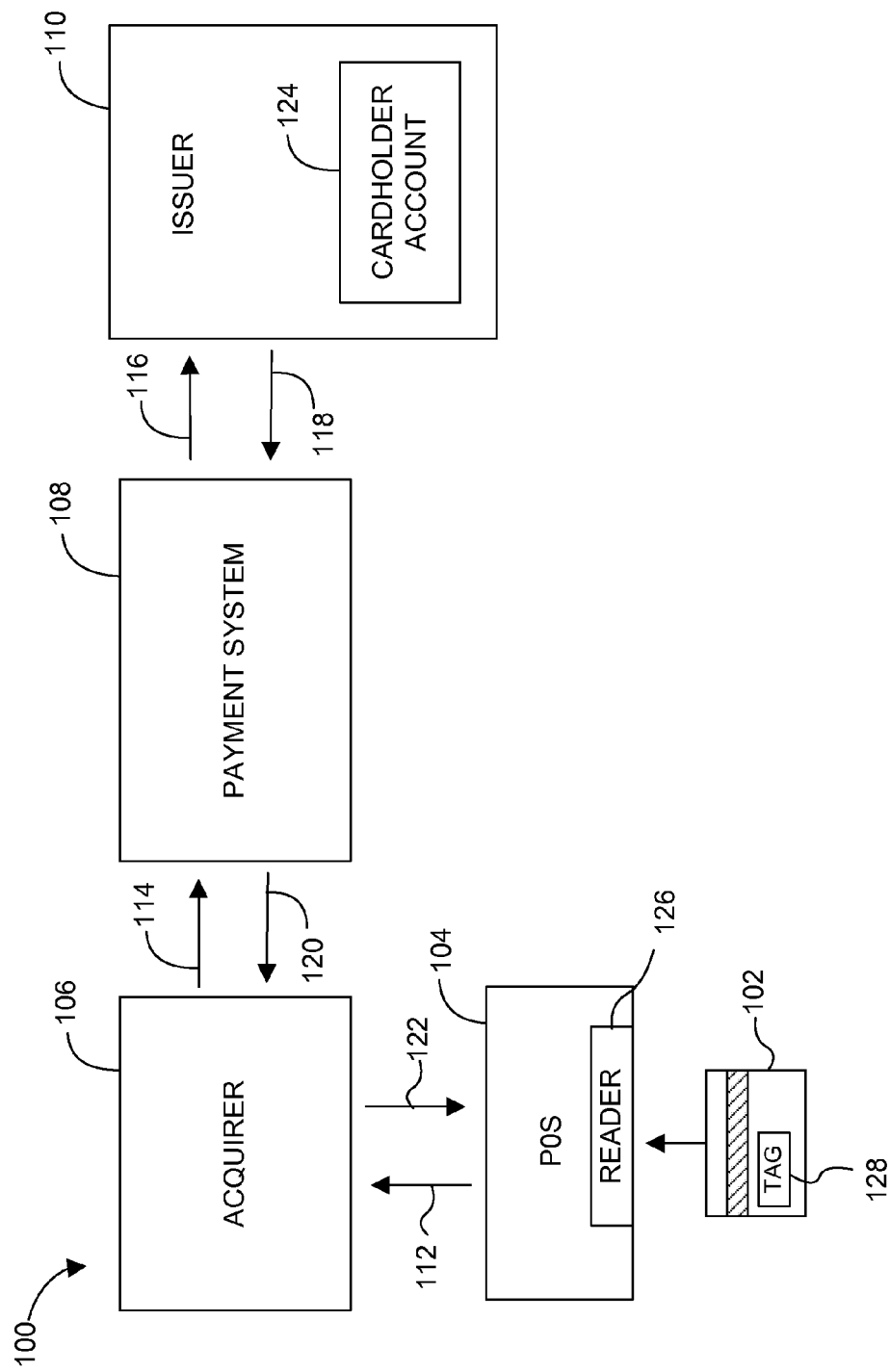
FIG. 1 is a block diagram that illustrates a conventional payment system.

Example embodiments use a single tap between a contactless enabled portable device (e.g., mobile telephone handset, tablet, etc.) and a POS terminal to set up a secure wireless portable-to-POS connection, over which enhanced payment transactions can be enabled. Enhanced payment transactions may include store voucher (e.g., offer, coupon, token, discount notice) acquisition, voucher redemption, loyalty point acquisition, loyalty point redemption, portable device pin entry and electronic receipting. The data to be communicated includes data identifying the equipment to be securely connected (e.g., POS and portable device), the goods purchased and other items including pictures of goods scanned on the POS, currency exchange, store vouchers, POS user instructions, receipt information, etc. The secure portable-to-POS communication is bidirectional and may use any available mobile wireless technologies (e.g., Wi-Fi, Bluetooth, 3G, LTE, etc.)

Example embodiments provide ability for contactless payment devices, including contactless-enabled mobile telephones, to be used at point of sale terminals which either do not have a contactless device reader or that have a contactless device reader but for which improved transaction processing is desired.

These example embodiments include the use of a contactless tag device affixed or in close proximity to a point of sale (POS) terminal, such as an electronic cash register (ECR). The POS tag is read by a portable device (such as a contactless-enabled mobile telephone) to identify details necessary for the portable device to establish a wireless connection to the POS terminal using wireless technology, such as Wi-Fi network, Bluetooth, or the like, in order to communicate (in both directions) purchase information data and to conduct a payment transaction. The data to be communicated includes, for example, data identifying each item of equipment used in the transaction (including the ECR and the specific portable device), goods or services to be purchased, items and services associated with the purchase transaction (including, for example, pictures of goods scanned on the POS, coupons and voucher codes, prices, discounts, quantities, payment tokens, receipt information, etc.).

Other example embodiments include a portable device and a POS terminal having contactless interface for exchanging information.

In these example embodiments information necessary to establish a wireless connection between the portable device and the POS terminal is transferred by tapping the portable device to the contactless interface of the POS terminal. The wireless connection can be established using wireless technology, such as Wi-Fi network, Bluetooth, or the like, in order to communicate (in both directions) purchase information data and to conduct a payment transaction.

DETAILED DESCRIPTION OF EXAMPLE EMBODIMENTS

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

In the following a contactless exchange of information refers to exchanging information using smartcard or NFC technology that requires the communicating devices to be "tapped", which means that the contactless interfaces are brought within several centimeters of each other. A contactless interface can read an unpowered smartcard or NFC tag.

Thus the contactless interface of a device can refer to an NFC transceiver, a contactless reader or an unpowered RFID or NFC tag associated with the device.

In contrast, information exchange over a wireless connection does not require that the portable device be tapped to another device. The range of a Bluetooth connection is up to one hundred meters and Wi-Fi range can be extended indefinitely through the use of repeaters.

Devices equipped with a contactless interface are ideal for payment transactions where the amount of the purchase is low. For example, in the PayPass system the details of the payment transaction are entered on the POS and then the customer taps the portable device to the reader to make payment. Because the transaction amount is low no signature or other verification is required.

For transactions of higher value a contactless transaction would require multiple taps. For example, after the initial tap a PIN could be required for customer verification. The customer would then be required to enter the PIN on the portable device, have the portable device verify the PIN and tap a second time to provide the outcome of the PIN verification to the POS.

In another example, the customer could have a voucher or coupon stored on the portable device. Redemption of the coupon would require another tap.

The customer is thus required to remain near the POS terminal during the entire transaction and is not free to roam about the store and continue shopping or have free hands to bag the goods.

In the following, example embodiments are described that utilize a single tap to enable handover to a secure, persistent wireless connection between a customer's portable device and a POS terminal. All details of a payment transaction, including loyalty rewards and voucher acceptance and redemption, are then conducted over the secure, persistent wireless connection when the customer continues to checkout at the POS terminal or when the consumer is wirelessly connected and is able to move around the store and continue shopping.

In many cases the POS, for example an electronic cash register (ECR), could be enabled to communicate over a wireless network but the ECR does not include a reader such as the PayPass reader described above for reading an RFID or a Near Field Communication (NFC) tag.

In a first example embodiment, no physical contactless reader or terminal is required at the POS. Instead, the portable device needs only to be able to read an RFID or NFC tag attached or in close proximity to the POS to obtain information required to set up a secure, persistent wireless connection with the POS using a wireless network such as Wi-Fi, Bluetooth or another wireless network architecture.

Figure 2A:
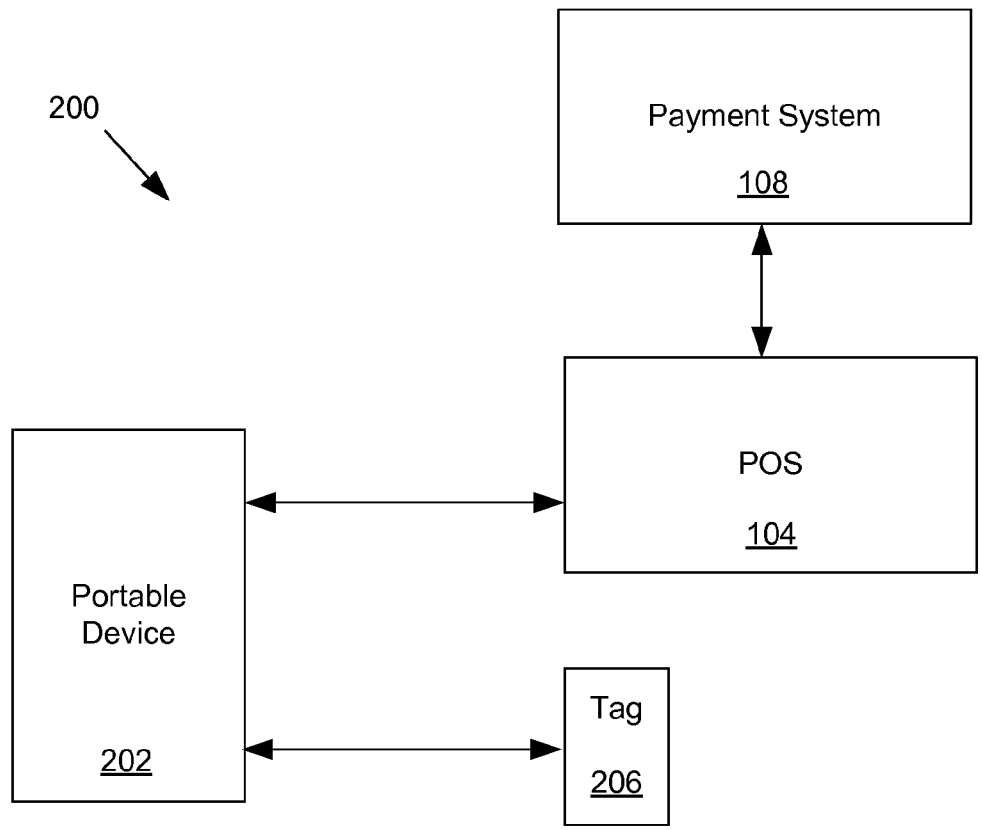
FIGS. 2A-B are block diagrams of a system pursuant to example embodiments.

FIG. 2A is a block diagram of a portion of a system 200 of an example embodiment. The changes to the conventional Payment System of FIG. 1 shown in FIG. 2A relate to the POS terminal 104 and use of a portable device 202 instead of the payment card 102. Accordingly, those elements of the standard Payment System depicted in FIG. 1 that are also used by the embodiment depicted in FIG. 2A are not shown in FIG. 2A.

In FIG. 2A a portable device 202 is configured with application software to allow it to operate as a portable payment device to connect to a wireless network to make a purchase at a point of sale location connected to the wireless network. The portable device 202 is further configured to operate as an RFID or NFC reader that is able to interrogate a contactless tag device to determine information stored on the tag device. A more detailed description of the portable device is set forth below with regard to FIG. 3.

The POS terminal 104, such as for example an ECR, operates in the standard way as described above with reference to FIG. 1. The POS terminal 104 also includes hardware and software required to allow the POS terminal to communicate over a wireless network. For example, the POS terminal may include a network interface card (NIC) that allows the POS terminal to interface with a Wi-Fi wireless network or Bluetooth hardware, such as a Bluetooth dongle, that allows the POS terminal to interface with a Bluetooth network and includes software necessary to communicate with the portable device over the wireless network as described in more detail below. A more detailed description of the POS terminal 104 is set forth below with reference to FIG. 4.

A contactless tag device 206 is associated with the POS terminal 104 and, in this example embodiment, is physically affixed or in close proximity to the POS and may include information such as an identification number associated with the specific cash register with which it is associated. The tag device 206 may further store information used by the portable device 202 to identify a network handover, e.g., pursuant to NFC specifications defining a connection handover protocol, allowing the portable device 202 to establish communication with the POS 104 over a wireless network 108 identified in the handover message, such as a Wi-Fi network, a Bluetooth network, or the like. This information is transmitted to the portable device when the portable device taps the contactless tag. A more detailed description of the contactless tag device 206 is set forth below with reference to FIG. 5.

Figure 2B:
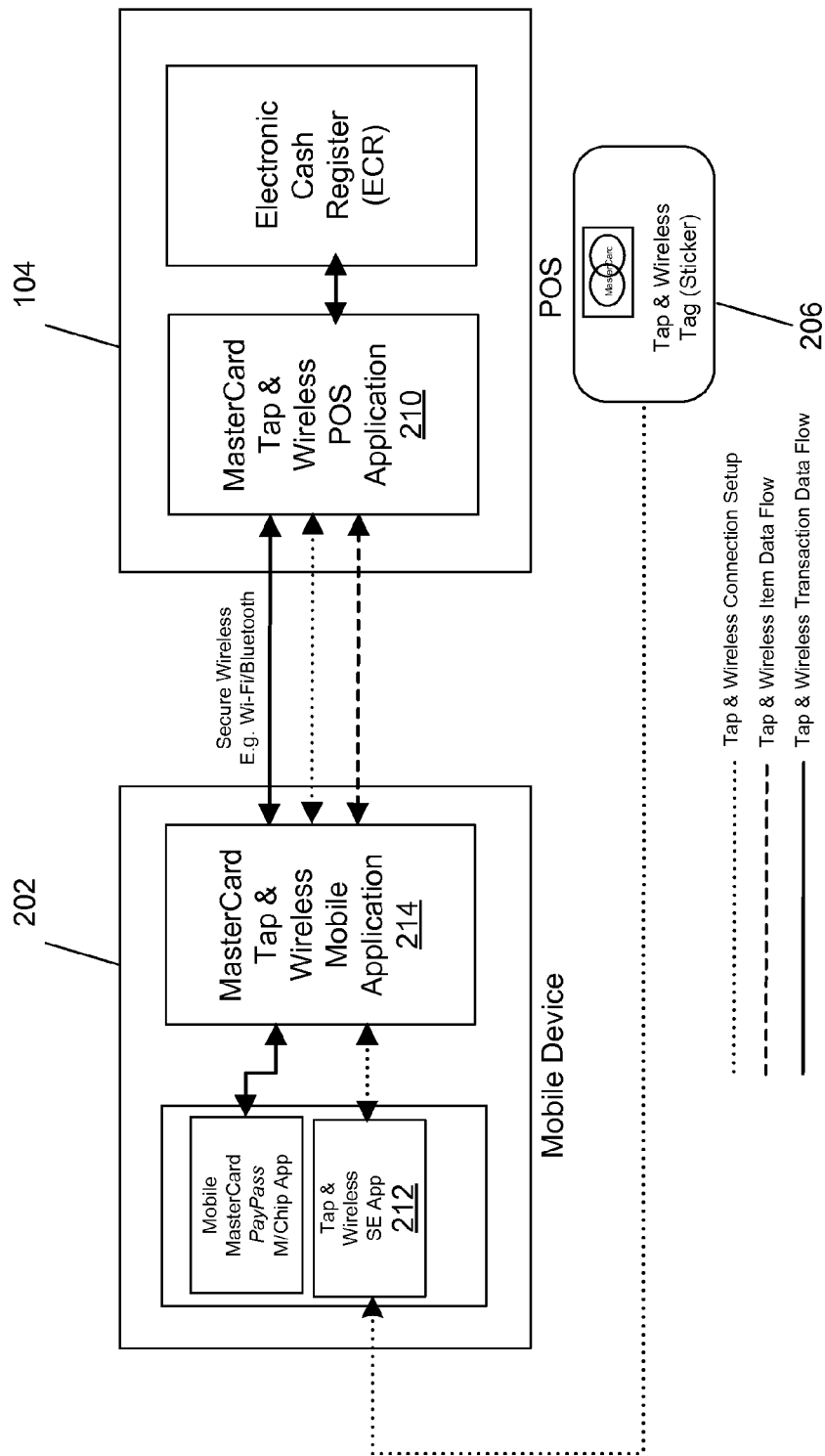

FIG. 2B is a block diagram of an example embodiment designed to use the tag device 206 associated with the POS terminal 104 that does not include a contactless interface. The example POS terminal 104 includes a MasterCard Tap & Wireless POS Application 210 which manages the establishment of a persistent, secure wireless connection with the portable device.

In this case, the portable device and tag device exchange information which is required to establish a direct secure wireless connection between the portable device and POS terminal. This information includes which wireless technology to use (e.g., Bluetooth, Wi-Fi, etc.), security information and any configuration information. After the initial tap and successful portable device to POS terminal connection, no further interaction is expected with the tag device. All processing proceeds between the portable device and POS terminal over the secure, persistent wireless connection. The tag device belongs to and is affixed in retail store space in close proximity to the POS.

The example portable device 202 includes a Tap & Wireless Secure Element (SE) Application 212 and MasterCard Tap & Wireless Mobile Application 214 which manages the establishment of a persistent and secure wireless connection with the POS terminal. In an example embodiment, the payment application and the new Tap & Wireless application reside in the Secure Element to protect key and other sensitive data.

Figure 3:
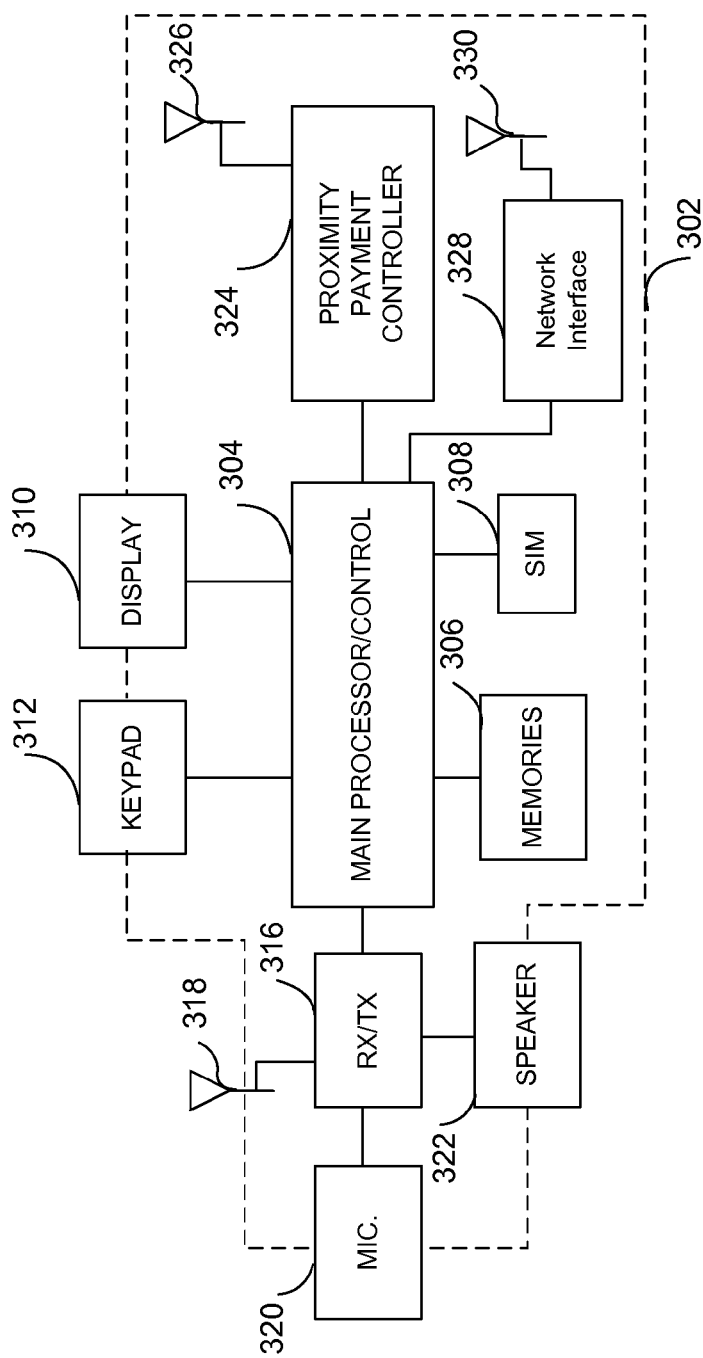
FIG. 3 is a block diagram representation of an example mobile telephone as depicted in FIGS. 2A-B.

FIG. 3 is a block diagram representation of the portable device 202, in this example a mobile telephone. Since the mobile telephone 202 is also operable for contactless payment transactions in addition to conventional mobile telephone functions, it will sometimes be referred to herein as a mobile telephone/contactless payment device.

The mobile telephone/contactless payment device 202 may include a conventional housing (indicated by dashed line 302 in FIG. 3) that contains and/or supports the other components of the mobile telephone/contactless payment device 202. The mobile telephone/contactless payment device 202 further includes conventional control circuitry 304 for controlling overall operation of the mobile telephone/contactless payment device 202. Other components of the mobile telephone/contactless payment device 202, which are in communication with and/or controlled by the control circuitry 304, include: (a) one or more memory devices 306 (e.g., program and working memory, etc.); (b) a conventional SIM (subscriber identification module) card 308; (c) a keypad 312 (which for present purposes will be understood to include the other buttons, switches and keys referred to or may be implemented as soft keys on the display) for receiving user input; and (d) a display component 310 for displaying output information to the user.

The mobile telephone/contactless payment device 202 also includes conventional receive/transmit circuitry 316 that is also in communication with and/or controlled by the control circuitry 304. The receive/transmit circuitry 316 is coupled to an antenna 318 and provides the communication channel(s) by which the mobile telephone/contactless payment device 202 communicates via the mobile network (not shown). The mobile telephone/contactless payment device 202 further includes a conventional microphone 320, coupled to the receive/transmit circuitry 316, for receiving voice input from the user. In addition, a loudspeaker 322 is included to provide sound output to the user, and is coupled to the receive/transmit circuitry 316.

In conventional fashion, the receive/transmit circuitry 316 operates to transmit, via the antenna 318, voice signals generated by the microphone 320, and operates to reproduce, via the loudspeaker 322, voice signals received via the antenna 318. The receive/transmit circuitry 316 may also handle transmission and reception of text messages and/or other data communications via the antenna 318.

The mobile telephone 202 further includes a contactless interface 324 with an antenna 326, here labeled the Proximity Payment Controller, which can function to read the tag device associated with the POS 104 to receive network handover and other information from the tag device as described above. The contactless interface 324 can also function to transmit network handover information to a reader on the POS as described below.

The example mobile telephone/contactless payment device 202 also includes network interface hardware 328 having a loop antenna 330 that can function to connect to wireless networks such as Wi-Fi, Bluetooth, etc.

In accordance with conventional teachings, the mobile telephone/contactless payment device 202 may include a "Secure Element" (not separately shown) which may constitute a portion of the proximity payment controller 324, control circuit 304 or of the SIM card 308. The Secure Element may store the payment application program and payment card account number and/or other sensitive information related to the payment capabilities of the mobile telephone 202.

In its hardware aspects, the mobile telephone 202 may be entirely conventional, but it may be programmed to establish a persistent, secure wireless connection with a POS terminal and to perform shopping functions and payment transactions as described herein. The Tap & Wireless SE Application 212 and MasterCard Tap & Wireless Mobile Application 214 may be stored in the memories 306 and executed by the processor 304 to implement this functionality.

At present, one possible specification to which commands and data of a payment application may conform is the EMV interoperable payments specification set forth by EMVCo, LLC (901 Metro Center Boulevard, Mailstop M3-3D, Foster City, Calif., 94404, USA). It will be appreciated that, strictly speaking, the EMV specification defines the behavior of a terminal; however, the mobile telephone can be configured to conform to such EMV-compliant terminal behavior and in this sense is itself EMV-compliant. It will be appreciated that embodiments can be configured in a variety of different ways.

Figure 4:
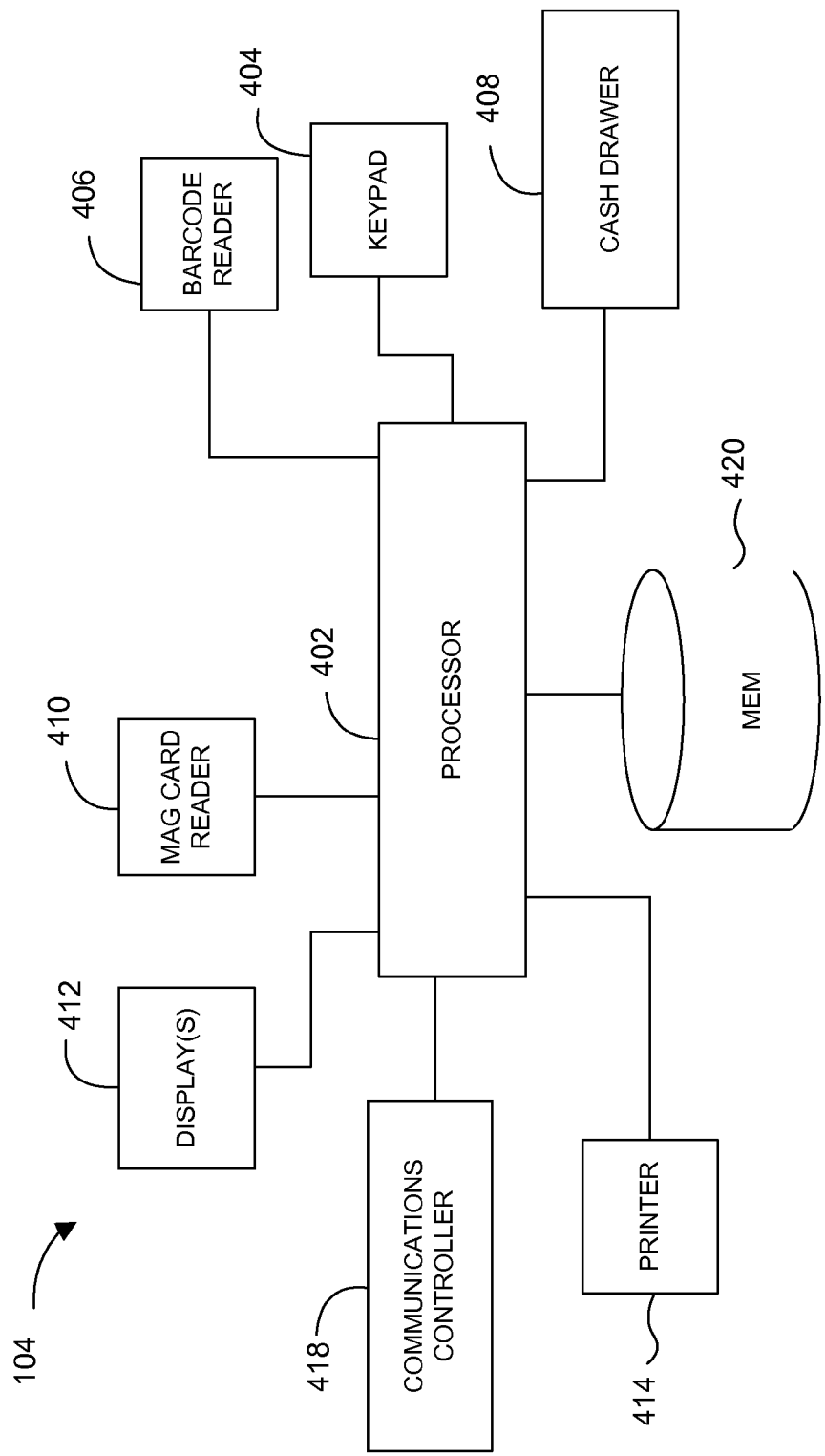
FIG. 4 is a block diagram representation of an electronic cash register as depicted in FIGS. 2A-B.

FIG. 4 is a block diagram of an example POS terminal 104 that may be used with the embodiments depicted in FIGS. 1 and 2. In some embodiments, the POS terminal 104 may be largely or entirely conventional in its hardware aspects. Nevertheless, the POS terminal 104 may be programmed in accordance with the aspects of the present invention to provide functionality as described herein.

The POS terminal may include a processing element (or elements) such as the processor 402 shown in FIG. 4. The processor 402 may, for example, be a conventional microprocessor, and may operate to control the overall functioning of the POS terminal 104. The POS terminal may also include conventional peripheral components, in communication with and/or controlled by the processor 402, such as: (a) a keypad 404 for receiving input from the human operator of the POS terminal; (b) a barcode reader 406 for reading product barcodes from products brought to the equipment for purchase; (c) a cash drawer 408 for storing cash received from customers; (d) a magnetic stripe reader 410 for reading payment card account numbers and related information from magnetic stripe payment cards; (e) one or more displays 412 for providing output (e.g., identifying products presented for purchase and their prices, indicating sales tax due, indicating transaction subtotals and totals, etc.); (f) a printer 414 for printing out sales receipts; and (g) a communication controller 418, that may include network interface hardware for allowing the processor 402 and hence the POS terminal 104 to engage in communication over data networks with other devices (e.g., a merchant processing system, an acquirer or its transaction processor, an issuer of the merchant's payment card account, etc.) In some embodiments, at least one of the displays 412 may be a touch screen, so as to provide an input function as well as an output function.

In some embodiments, the communication controller 418, or another communication device coupled to the processor 402, may include network interface hardware and a loop antenna to allow the POS terminal 104 to transmit and receive text messages or the like via a mobile telephone network and to communicate with wireless networks such as Wi-Fi, Bluetooth, etc.

The communication controller 418 may further include a contactless interface including an RFID/NFC proximity reader such as an NFC reader, which can function to read a tag device associated with a portable device or exchange messages with the contactless interface of the portable device.

In addition, the POS terminal 104 may include one or more memory and/or data storage devices 420, which may comprise any combination of one or more of a hard disk drive, RAM (random access memory), ROM (read only memory), flash memory, etc. The memory/data storage device(s) 420 may store software and/or firmware that programs the processor 402 and the POS terminal 104 to perform functionality as described herein. Further, the POS terminal may include one or more housings (not shown) which contain and/or support one or more of the other components shown in FIG. 4.

In example embodiments the memory 420 stores drivers to control network interface hardware, security credentials, applications for managing secure transactions that provide functions related to data and communication security, including data encryption and encryption key management, and the above-described MasterCard Tap & Wireless POS Application 210.

Those who are skilled in the art will recognize that components keypad 404 and display 412 may be integrated in a single unit, and may include a display/touch screen to allow for user interaction.

Figure 5:
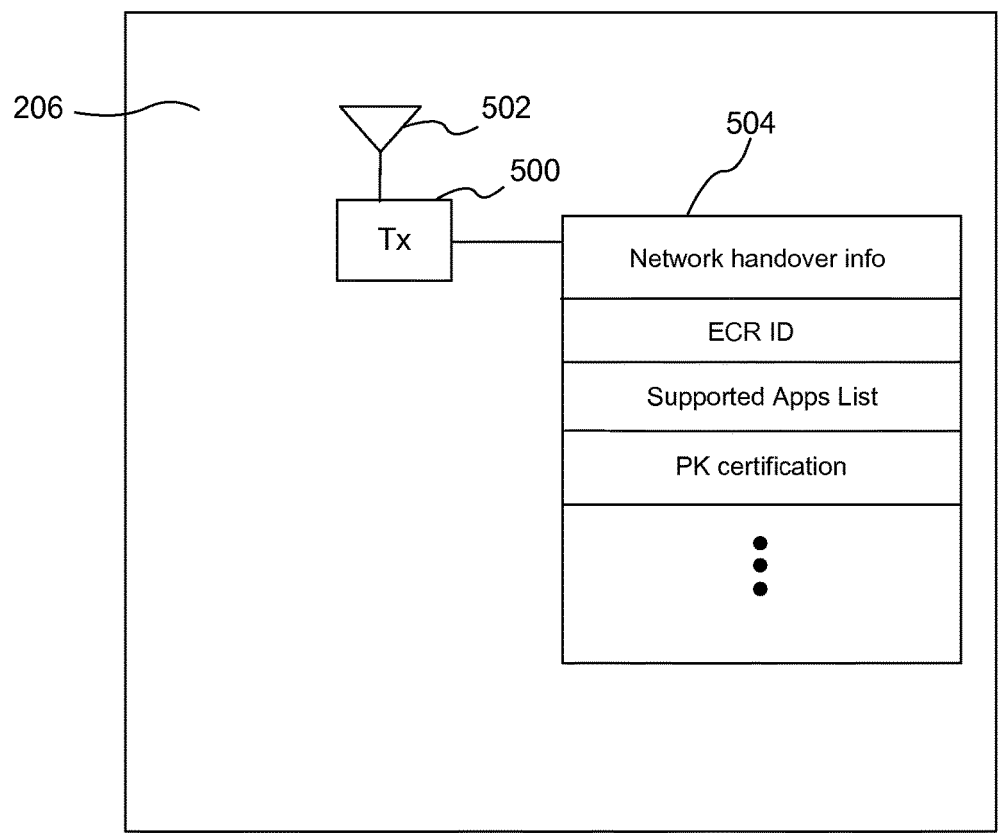
FIG. 5 is a block diagram representation of an RFID tag device.

An example of the wireless tag device is depicted in FIG. 5. The tag device 206 includes a wireless transmitter 500 and a loop antenna 502. As is known in the art, the transmitter is energized by radiofrequency (RF) energy transmitted by a reader, such as the reader included in the portable device 202. The tag device 206 includes a memory 504 that holds information to be transmitted from the tag device 206 to the reader.

In this example the memory may hold information identifying the ECR associated with the tag. The ECR identification information can identify a wireless network to which the ECR can be connected, the ECR-ID in the network, a list of applications that are supported and/or not supported over the wireless network, public key certificates from either party (portable device or POS terminal) and so forth.

Figure 6:
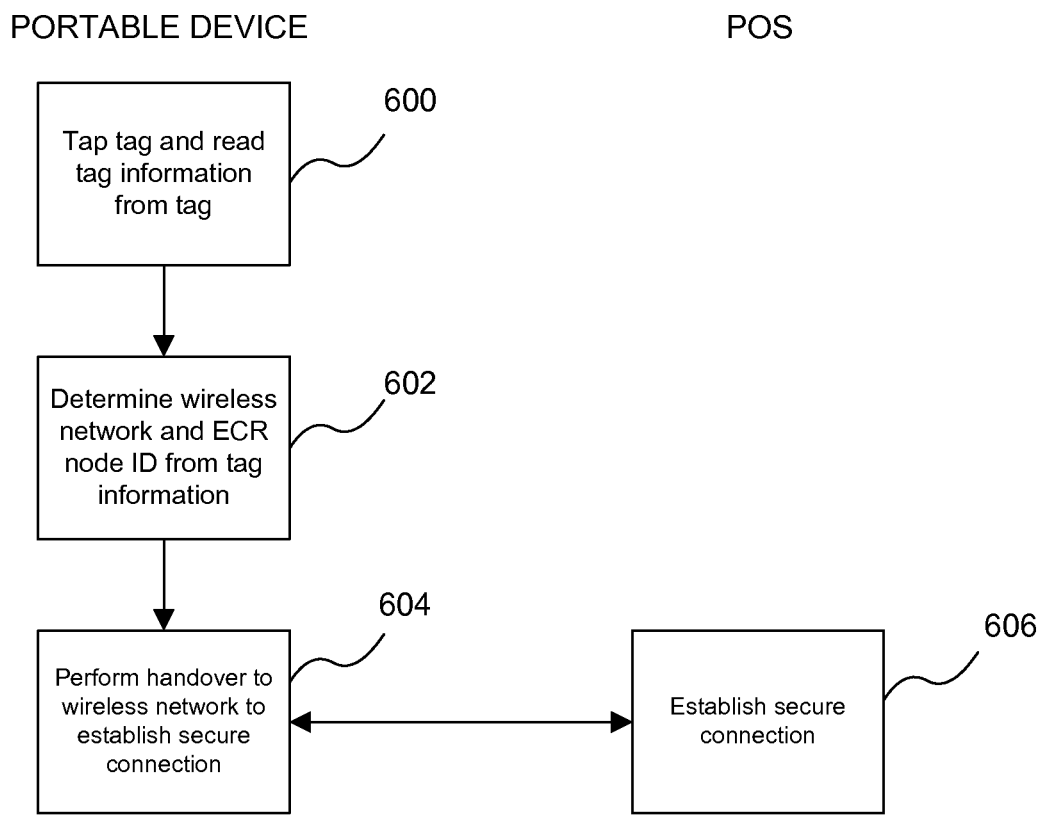
FIG. 6 is a flow chart representation of the operation of an example embodiment.

FIG. 6 is a flow chart illustrating the operation of the example embodiment of FIGS. 2A and B.

In process step 600 a customer holding the portable device 202 taps or presents the portable device 202 to the tag device 206 (e.g., by "tapping" the portable device 202 to the tag device 206) and the portable device reads the tag information stored on the tag device 206. The tag information includes wireless handover information identifying a wireless network to be used to establish a wireless connection between the portable device and the POS terminal. If the identified network were a Bluetooth network then the Bluetooth address of the POS terminal would be read from the tag device 206.

Additionally, data required to establish a secure connection including data encryption and encryption key management data is read during the initial tap.

Also, as described above, in some example embodiments the tag information includes a list of applications supported over the wireless connection. This information allows the portable device to use the wireless connection only for supported applications during the payment transaction. This information could also include information allowing software on the portable device to determine whether it is opportune to use the wireless network to perform the payment transaction.

In process step 602 the portable device uses the tag information to determine the wireless network that will be used to form a wireless connection between the portable device and the POS terminal.

In process step 604 and 606 the mobile device communicates with the ECR over the wireless network to establish a secure connection utilizing, for example the Bluetooth address of the POS terminal and the secure keys. For example, if NFC is utilized for the tap and the selected wireless network is the Bluetooth network, then the tag could store data similar or identical to the data stored in an NFC Handover Select Record that would be utilized by the portable device to perform a handover from NFC to a Bluetooth wireless network. The Tap and Wireless handover procedure may use the NFC static handover procedure defined in Sec. 4.2 of the document entitled Bluetooth Secure Simple Pairing Using NFC, NFC Forum-AD-BTSSP-1.0, Oct. 10, 2011, page 20 or a variant thereof that is optimized for use with the Tap and Wireless embodiments.

Figure 7:
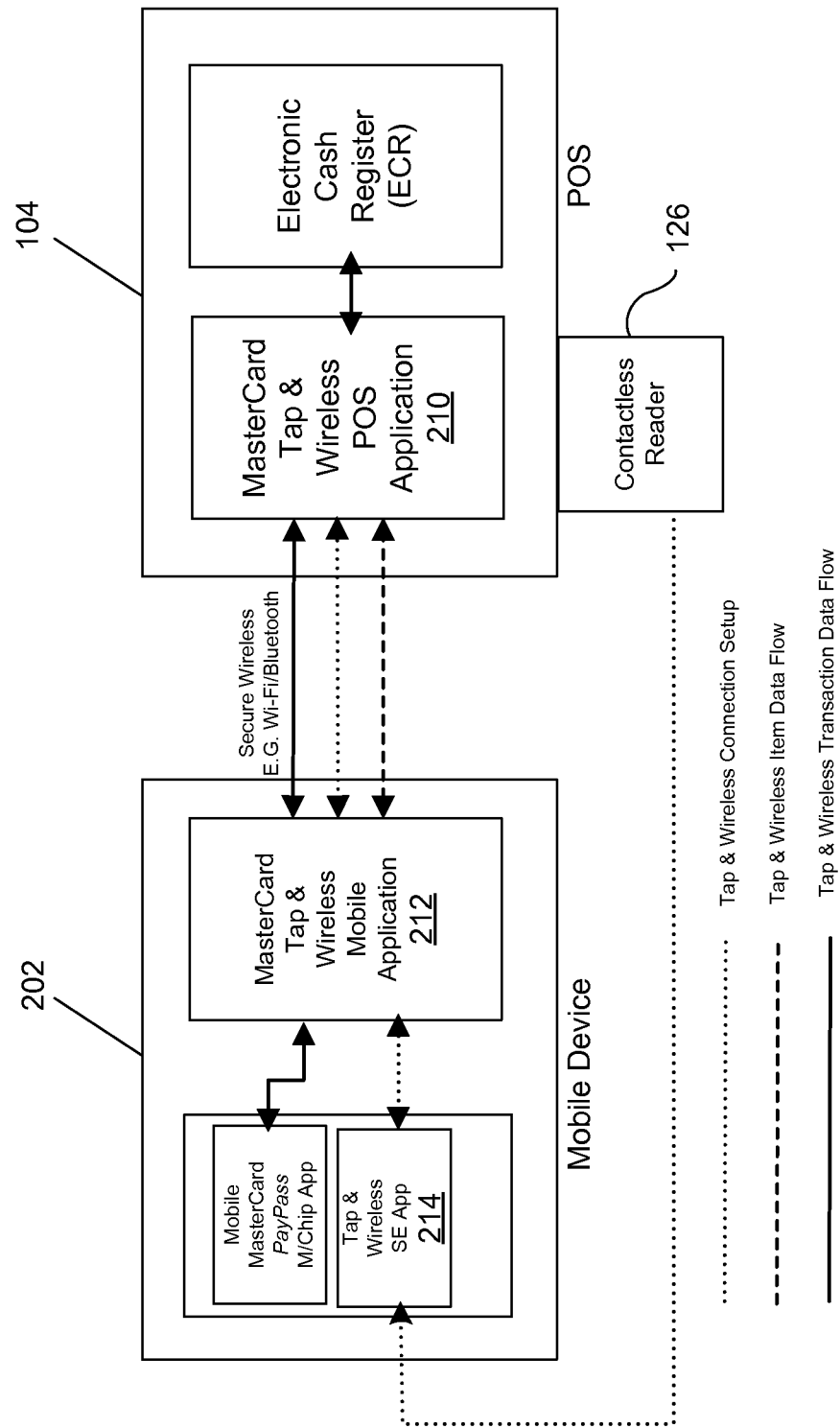
FIG. 7 is a block diagram of a system pursuant to another example embodiment.

FIG. 7 depicts an example embodiment where the POS terminal 104 includes a contactless reader 126. In this example embodiment, the information required to establish a secure, wireless connection is now stored in the portable device and read by the contactless reader when the portable device is tapped to the reader. The MasterCard Tap & Wireless POS Application 210 is configured to use the information transmitted by the portable device to establish a persistent, secure wireless connection with the portable device. The POS would then establish the secure wireless connection utilizing the procedure described above with reference to FIG. 6.

In this example, the reader on the POS may be utilized to receive different information from the portable device during different taps. As described above, the customer could be requested to enter the PIN on the mobile device, have the mobile device verify the PIN and then tap the POS terminal reader to transfer the outcome of the PIN verification to the POS.

In this example embodiment, multiple taps may be utilized to transfer information from the portable device to the POS terminal reader. Accordingly, the Tap & Wireless Mobile Application 212 could determine that some transactions could be more efficiently performed using PayPass taps or other contactless message exchanges than by employing the secure, wireless connection. In this case, the Tap & Wireless Mobile Application responds to the state of a transaction to determine whether to establish or use a secure wireless connection.

For example, the decision by the portable device whether to publish wireless interface capability to the POS can be based on such factors as the types of wireless network interfaces supported, transaction amount, eligible applications such as payment, coupon and loyalty applications, services such as merchandise scanning, receipt delivery, display capability and cardholder verification methods, and customer preferences.

In some cases the Tap & Wireless Mobile Application determines a list of applications to be performed using the wireless interface and with remaining applications performed using the contactless interface.

In the following, shopping and payment transactions are described that require only one tap to perform all transaction interactions over a secure, wireless synchronized connection.

Figure 8:
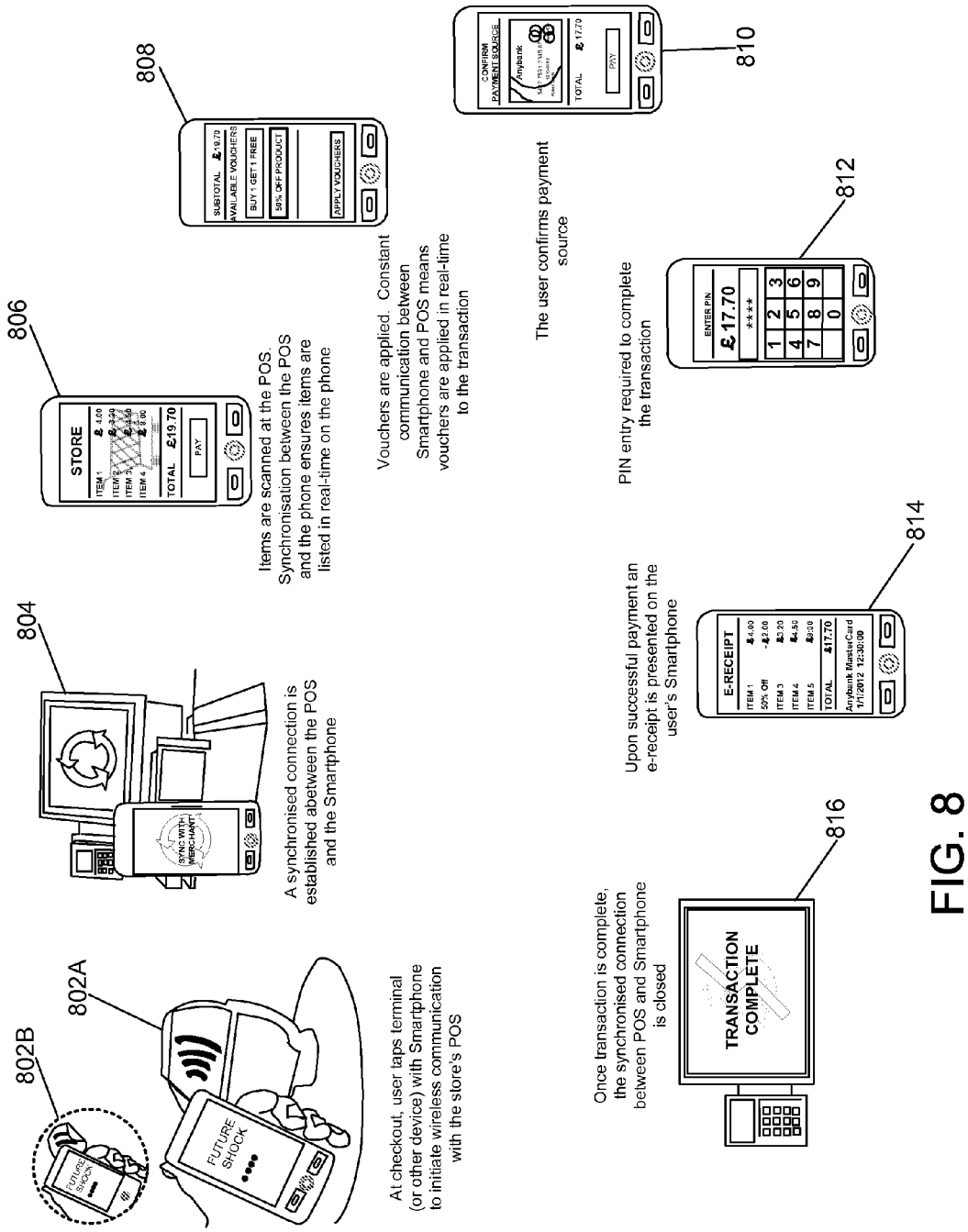
FIGS. 8 and 9 illustrate flow diagrams depicting steps of an example transactions.
Figure 9:
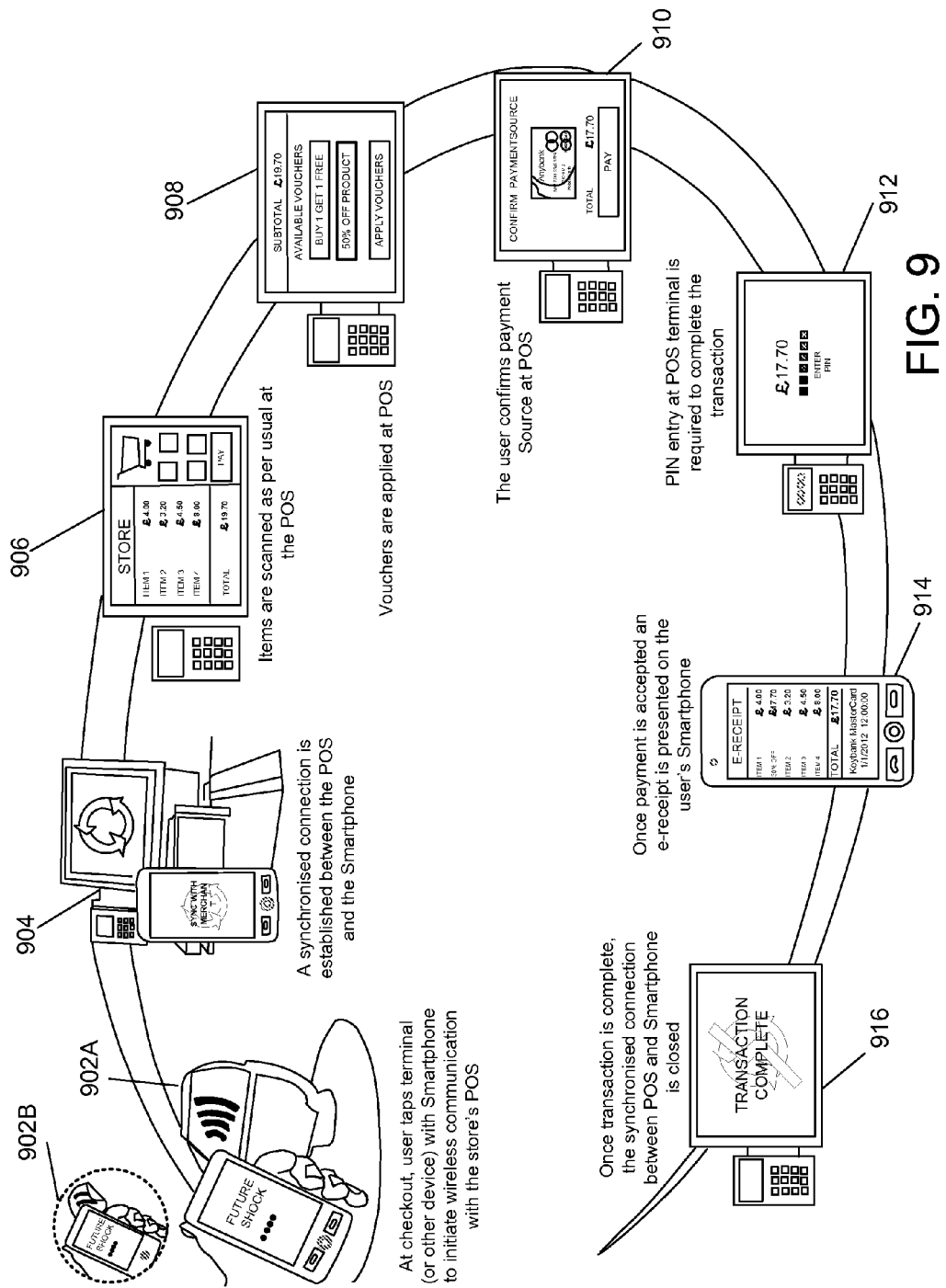

Process flow for transactions in example embodiments are illustrated in FIGS. 8 and 9. As will be described more fully below the processes can be implemented in both the example embodiment depicted in FIG. 2B and the example embodiment depicted in FIG. 7.

In FIG. 8 a process flow is depicted where the display and entering of information during a payment transaction and an ongoing shopping experience takes place primarily on the portable device. In this example embodiment the Tap & Wireless Mobile Application performs process steps performed by the portable device and the Tap & Wireless POS Application performs steps performed on the POS terminal.

In process step 802A the user taps the portable device to a reader at the POS terminal. Alternatively, the portable device can be tapped 802B to a tag associated with the POS terminal to read the tag information. Software on either the portable device or the POS terminal can be configured so that after the initial tap the context of the payment transaction can be stored either on the portable device or the ECR or a network server so that a next transaction can be optimized. For example, the public key certificates used in the communication could be cached.

Whether the portable device is tapped to a POS reader or reads a tag, the process advances to process step 804 where information exchanged during the tap is utilized to establish a secure, persistent, synchronized wireless connection between the POS and the portable device. At this point, the portable device becomes an interactive extension to the POS hardware and allows richer enhancements including exchange of service and information between the store and the user.

In process step 806 items scanned at the POS are listed in real time on the screen of the portable device. The scanned information from the POS terminal is transmitted to the portable device over the secure, persistent, synchronized wireless connection. The scanned information is received and displayed on the screen of the portable device.

In process step 808 vouchers or coupons may be applied to the transaction. In this example embodiment, the customer may continue to checkout at the POS terminal or may move about the store and continue shopping because the consumer is wirelessly connected to the POS terminal. The customer can freely browse and pre-select vouchers, receive real-time store offers or POS instructions upon the portable device at any time during the transaction. Vouchers (one or any number) can also be selected after the 'total payment amount' is known, whereupon the 'final payment amount' is readjusted. Users may elect to store vouchers on the portable device for later use. The user may select additional goods, be provided with vouchers for the goods over the wireless connection, apply the vouchers to the transaction, pay for the merchandise and receive a receipt without being required to be near the POS terminal.

The user selects a voucher using the touchscreen of the portable device and then touches the "APPLY VOUCHER" icon causing the portable device to transmit information to the POS that allows the POS to apply the terms of the voucher to the transaction.

In process step 810 the user selects and confirms a payment source such as a credit card, debit card, PayPal account etc. and touches the "Pay" icon to begin a payment transaction.

In many payment transactions a user's Personal Identification Number (PIN) is utilized to authenticate the user. In process step 812 the user enters the PIN using the touchscreen of the portable device. When the "ENTER PIN" icon is touched the PIN is verified by the portable device and the outcome of the PIN verification is transmitted to the POS terminal over the wireless connection.

Subsequent to completion of the payment transaction a receipt is generated on the POS terminal, transmitted from the POS terminal to the portable device and displayed on the screen of the portable device in process step 814. The receipt is stored on portable device to provide the customer with a permanent record of the transaction.

Once the transaction is complete in process step 816 the wireless connection between the portable device and POS terminal is closed.

In FIG. 9 a process flow is depicted where the display and entering of information during a payment transaction and ongoing shopping experience takes place primarily on the POS terminal. In some embodiments some or all of the information displayed on the screen of the POS terminal can be mirrored on the screen of portable device. In this example embodiment the Tap & Wireless Mobile Application performs process steps performed by the portable device and the Tap & Wireless POS Application performs steps performed on the POS terminal.

In process step 902A the user taps the portable device to a reader at the POS terminal. Alternatively, the portable device can be tapped 902B to a tag associated with the POS terminal to read the tag information.

In either case, the process advances to process step 904 where information exchanged during the tap is utilized to establish a secure, persistent, synchronized wireless connection between the POS and the portable device In process step 906 items are scanned and each item ID and its price are displayed on the POS terminal screen.

In process step 908 vouchers are applied at the POS terminal.

In process step 910 a payment source is confirmed and the payment process is initiated at the POS terminal. If PIN entry is required, at process step 912 the customer's PIN is entered at the POS terminal.

In process step 914 a receipt is generated at the POS terminal when the payment transaction is complete, transmitted to the portable device and displayed on the screen of the portable device. The receipt is also saved on the portable device so that the customer has a permanent record of the transaction.

Once the transaction is complete in process step 916 the wireless connection between the portable device and POS terminal is closed.

In the example embodiment described with reference to FIG. 9 the process of authentication is performed on the POS terminal. In another example embodiment, the PIN can be entered at the POS terminal and transmitted to the portable device over the wireless connection. The authentication is then performed by the portable device and a message is sent to the POS terminal indicating whether the customer authentication succeeded.

As described above with reference to FIGS. 8 and 9 the user may be prompted to enter a PIN on the portable device when the payment transaction is being completed. In another example, the user pre-enters the PIN immediately after the wireless connection is established so that the user can shop, transact and leave.

Figure 10:
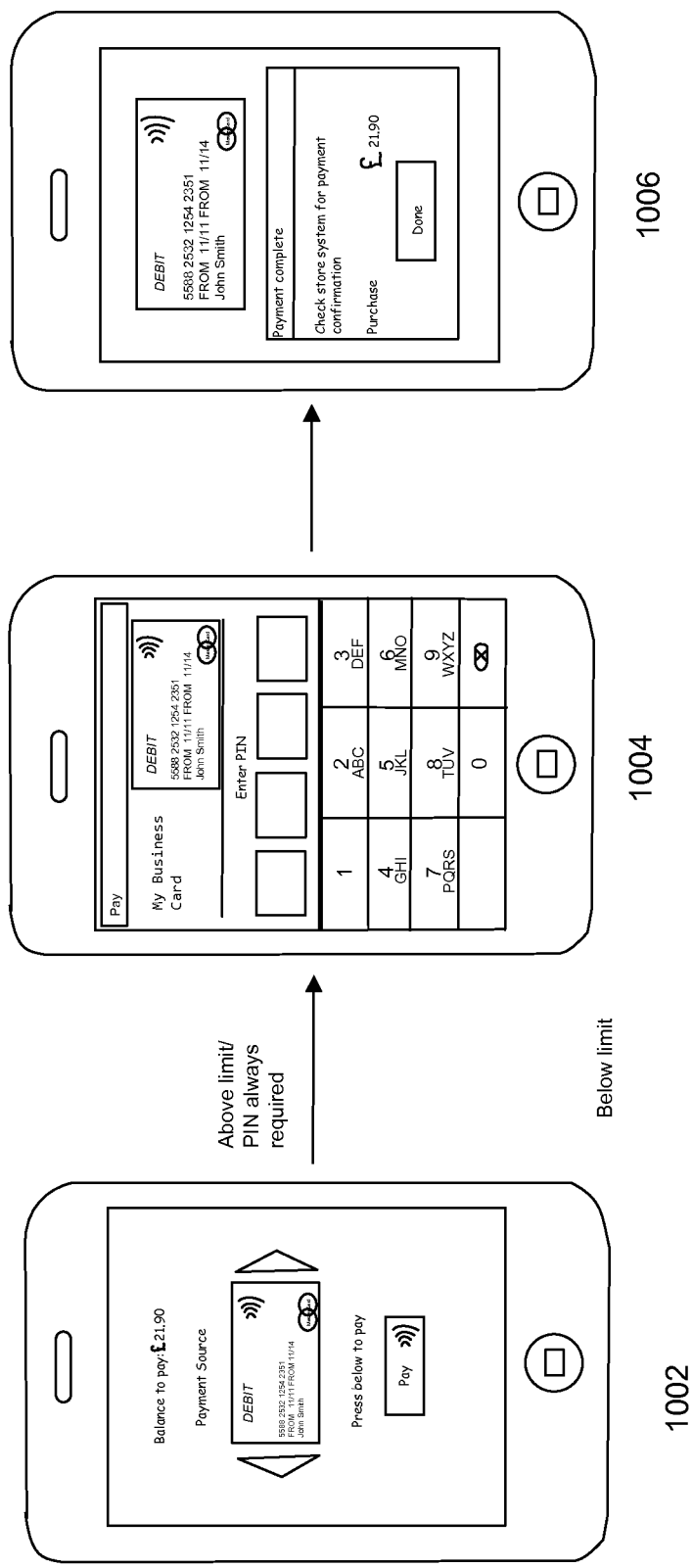
FIG. 10 illustrates a flow diagram depicting steps of an example of entering a PIN on the portable device.

Alternatively, as depicted in FIG. 10, PIN entry may be eliminated in certain circumstance. For example, in another embodiment the portable device is configured 1002 for instant payment without PIN entry if the transaction amount is below a preset limit. However, if the transaction amount is above the preset limit then the user is prompted 1004 to enter the PIN on the portable device and then a transaction complete page is displayed 1006 on the screen of the portable device.

As the term "payment transaction" is used herein and in the appended claims, it should be understood to include the types of transactions commonly referred to as "purchase transactions" in connection with payment card systems.

As used herein and in the appended claims, the term "initiating a transaction" includes the step of a proximity payment device such as a payment-enabled mobile telephone 202 communicating a payment card account number to a cash register 104, as well as interrogating a tag device 206 or other RFID or NFC device to identify information used herein.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. A method performed by a processor included in a portable device, where the portable device includes a contactless interface and a wireless network interface, with the method comprising:

exchanging, using the contactless interface included in the portable device, transaction information associated with an electronic merchant device when the portable device is brought in close proximity to a contactless interface associated with the electronic merchant device, with the transaction information identifying the electronic merchant device and identifying a handover wireless connection between the portable device and the electronic merchant device and with the transaction information including customer preference and decision criteria for setting up a secure connection and security credentials required to form a secure connection;

establishing a persistent, secure wireless connection, using the wireless network interface and the transaction information, between the portable device and the electronic merchant device;

exchanging transaction messages between the portable device and the electronic merchant device over the persistent, secure wireless connection during a shopping interval;

the exchanging transaction information step, the establishing a persistent connection step, and the exchanging transaction messages step each performed after utilizing a single bidirectional wireless transmission to setup the persistent connection between the portable device contactless interface and the electronic merchant device for a duration of the shopping interval;

maintaining the persistent, secure wireless connection during the shopping interval as the customer moves about the merchant's facility; and closing the persistent, secure wireless connection at the end of the shopping interval.

2. The method of claim 1 where the information exchanged between the portable device and the electronic merchant device includes wireless capability and transaction context information, such as transaction amount, terminal capabilities on couponing, cardholder verification requirements, capabilities and options, receipt handling options and preferences, receipt handling and so on and further comprising:

utilizing the wireless capability and transaction context information in a decision process on whether to set up the wireless session or to continue a transaction over the contactless interface.

3. The method of claim 2 where exchanging transaction messages comprises:

sending a message from the portable device to the electronic merchant device indicating whether to include wireless capability and indicating customer preference on the overall transaction process including payment application selection, coupon selection and receipt delivery.

4. The method of claim 1 where exchanging transaction messages comprises at least one of: (i) sending and receiving messages at the mobile device including EMV commands and data to perform a payment transaction, (ii) sending a message from the portable device to the electronic merchant device including messages, logos and instructions to be displayed by the electronic merchant device to the customer in order to guide the customer through the various transactions, (iii) receiving a message sent from the electronic merchant device to the portable device including messages, logos and instructions to be displayed on the portable device to guide the customer through the various transactions, and (iv) sending a message from the portable device to the electronic merchant device including authentication information or the result of an authentication process.

5. The method of claim 4 where the authentication information includes a personal identification number (PIN), passcode, passphrase or biometrics or the result of an authentication process based on the personal identification number (PIN), passcode, passphrase or biometrics.

6. The method of claim 1 where exchanging transaction messages comprises:

receiving a message on the portable device sent from the electronic merchant device including authenticating information;

utilizing the authentication information on the portable device to authenticate the customer; and sending a message from the portable device to the electronic merchant device indicating whether customer authentication succeeded.

7. The method of claim 6 where the authentication information includes a personal identification number (PIN), passcode, passphrase or biometrics.

8. The method of claim 1 where exchanging transaction messages comprises at least one of:

(i) sending a message from the portable device to the electronic merchant device including a voucher to be redeemed upon checkout, (ii) receiving a message on the portable device sent from the electronic merchant device to write or update a voucher at installation or after redemption, (iii) receiving a message sent from the electronic merchant device to the portable device including information relating to merchandise scanned at the electronic merchant device, and (iv) receiving a message sent from the electronic merchant device to the portable device including a receipt generated at the electronic merchant device.

9. The method of claim 1 where the transaction information includes symmetric and/or public key exchange information, and with establishing a persistent, secure wireless connection further comprising:

using the symmetric and/or public key exchange information to perform authenticated and encrypted communication between the portable device and the electronic merchant device over the wireless network.

10. The method of claim 1 where the information exchanged between the portable device and the electronic merchant device includes a list of application supported by the electronic merchant device and further comprising:

selecting the applications for transactions which will be performed over the secure, persistent wireless connection and selecting the applications for transactions which will be performed over the contactless interface.

11. The method of claim 1 where the information exchanged between the portable device and the electronic merchant device includes a list of applications supported by the portable device and further comprising:

publishing applications for transactions which can be performed over the secure, persistent wireless connection and publishing applications for transactions which need to be performed over the contactless interface.

12. A method performed by a processor included in a portable device, where the portable device includes a contactless interface and a wireless network interface, with the method comprising:

reading, using the contactless interface included in the portable device, transaction information associated with an electronic merchant device when the portable device is brought in close proximity to a contactless tag device associated with the electronic merchant device, where the electronic merchant device does not include a contactless interface, with the transaction information identifying the electronic merchant device and identifying a handover wireless connection between the portable device and the electronic merchant device and with the transaction information including customer preference and decision criteria for setting up a secure connection and security credentials required to form a secure connection;

establishing a persistent, secure wireless connection, using the wireless network interface and the transaction information, between the portable device and the electronic merchant device;

exchanging transaction messages between the portable device and the electronic merchant device over the persistent, secure wireless connection during a shopping interval;

the reading transaction information step, the establishing a persistent connection step, and the exchanging transaction messages step each performed after utilizing a single bidirectional wireless transmission to setup the persistent connection between the portable device contactless interface and the electronic merchant device for a duration of the shopping interval;
maintaining the persistent, secure wireless connection during the shopping interval as the customer moves about the merchant's facility; and
closing the wireless connection at the end of the shopping interval.

13. The method of claim 12 where exchanging transaction messages comprises at least one of:
(i) sending and receiving messages at the mobile device including EMV commands and data to perform a payment transaction, (ii) sending a message from the portable device to the electronic merchant device including messages, logos and instructions to be displayed by the electronic merchant device to the customer in order to guide the customer through the various transactions, (iii) receiving a message sent from the electronic merchant device to the portable device including messages, logos and instructions to be displayed on the portable device to guide the customer through the various transactions, and (iv) sending a message from the portable device to the electronic merchant device including authentication information or the result of an authentication process.

14. The method of claim 13 where the authentication information includes a personal identification number (PIN), passcode, passphrase or biometrics or the result of an authentication process based on the personal identification number (PIN), passcode, passphrase or biometrics.

15. The method of claim 12 where exchanging transaction messages comprises:
receiving a message on the portable device sent from the electronic merchant device including authenticating information;
utilizing the authentication information on the portable device to authenticate the customer; and
sending a message to the electronic merchant device indicating whether customer authentication succeeded.

16. The method of claim 15 where the authentication information includes a personal identification number (PIN), passcode, passphrase or biometrics.

17. The method of claim 12 where exchanging transaction messages comprises:
sending a message from the portable device to the electronic merchant device including a voucher to be redeemed upon checkout.

18. The method of claim 12 where exchanging transaction messages comprises at least one of:
(i) receiving a message sent from the electronic merchant device to the portable device to write or update a voucher at installation or after redemption, (ii) receiving a message sent from the electronic merchant device to the portable device including information relating to merchandise scanned at the electronic merchant device, and (iii) receiving a message sent from the electronic merchant device to the portable device including a receipt generated at the electronic merchant device.

19. The method of claim 12 where the transaction information includes symmetric and/or public key exchange information, and with establishing a persistent, secure wireless connection further comprising:
using the symmetric and/or public key exchange information to perform authenticated and encrypted communication between the portable device and the electronic merchant device over the wireless network.

20. A method performed by a processor associated with an electronic merchant device, where the electronic merchant device includes a contactless interface and a wireless network interface, with the method comprising:
exchanging, using the contactless interface included in the electronic merchant device, transaction information associated with an electronic merchant device with a portable device brought in close proximity to the contactless interface associated with the electronic merchant device, where the portable device includes a contactless interface and a wireless interface, with the transaction information identifying the electronic merchant device and identifying a handover wireless connection between the portable device and the electronic merchant device and with the transaction information including customer preference and decision criteria for setting up a secure connection and security credentials required to form a secure connection;
establishing a persistent, secure wireless connection, using the wireless network interface and the transaction information, between the portable device and the electronic merchant device;
exchanging transaction messages between the portable device and the electronic merchant device over the persistent, secure wireless connection during a shopping interval;
the exchanging transaction information step, the establishing a persistent connection step, and the exchanging transaction messages step each performed after utilizing a single bidirectional wireless transmission to setup the persistent connection between the portable device contactless interface and the electronic merchant device for a duration of the shopping interval;
maintaining the persistent, secure wireless connection during the shopping interval as the customer moves about the merchant's facility; and
closing the wireless connection at the end of the shopping interval.

21. The method of claim 20 where the information exchanged between the portable device and the electronic merchant device includes wireless capability and transaction context information, such as transaction amount, terminal capabilities on couponing, cardholder verification, receipt handling and so on, and further comprising:
utilizing the wireless capability and transaction context information in a decision process on whether to set up the wireless session or to continue a transaction over the contactless interface.

22. The method of claim 21 where exchanging transaction messages comprises at least one of:
(i) receiving a message at the electronic merchant device from the portable device indicating whether to include wireless capability and indicating customer preference on the overall transaction process including payment application selection, coupon selection, receipt delivery, (ii) sending and receiving messages at the electronic merchant device including EMV commands, response and data to perform a payment transaction, (iii) receiving a message from the portable device including messages, logos and instructions to be displayed by the electronic merchant device to the customer in order to guide the customer through the various transactions, (iv) sending a message to the portable device including messages, logos and instructions to be displayed on the portable device to guide the customer through the various transactions, and (v) receiving a message from the portable device including authentication information.

23. The method of claim 22 where the authentication information includes a personal identification number (PIN), passcode, passphrase or biometrics.

24. The method of claim 20 where exchanging transaction messages comprises:
sending a message to the portable device including authenticating information; and
receiving a message on the electronic merchant device from the portable device indicating whether customer authentication succeeded.

25. The method of claim 24 where the authentication information includes a personal identification number (PIN), passcode, passphrase or biometrics.

26. The method of claim 20 where exchanging transaction messages comprises:
receiving a message from the portable device including a voucher to be redeemed upon checkout.

27. The method of claim 20 where exchanging transaction messages comprises:
sending a message from the electronic merchant device to the portable device to write or update a voucher at installation or after redemption.

28. The method of claim 20 where the transaction information includes symmetric and/or public key exchange information, and with establishing a persistent, secure wireless connection further comprising:
using the symmetric and/or public key exchange information to perform authenticated and encrypted communication between the portable device and the electronic merchant device over the wireless network.

29. A method performed by a processor associated with an electronic merchant device, where the electronic merchant device includes a contactless interface and a wireless network interface, with the method comprising:
establishing a persistent, secure wireless connection, using the wireless network interface and the transaction information, with a portable device after the portable device reads the transaction information from a contactless tag device associated with the merchant electronic device, with the transaction information identifying the electronic merchant device and identifying a handover wireless connection between the portable device and the electronic merchant device and with the transaction information including customer preference and decision criteria for setting up a secure connection and security credentials required to form a secure connection;
exchanging transaction messages between the portable device and the electronic merchant device over the persistent, secure wireless connection during a shopping interval;
the establishing a persistent connection step and the exchanging transaction messages step each performed after utilizing a single bidirectional wireless transmission to setup the persistent connection between the portable device contactless interface and the electronic merchant device for a duration of the shopping interval;
maintaining the persistent, secure wireless connection during the shopping interval as the customer moves about the merchant's facility; and
closing the wireless connection at the end of the shopping interval.

30. The method of claim 29 where the information exchanged between the portable device and the electronic merchant device includes wireless capability and transaction context information, such as transaction amount, terminal capabilities on couponing, cardholder verification, receipt handling and so on and further comprising:
utilizing the wireless capability and transaction context information in a decision process on whether to set up the wireless session or to continue a transaction over the contactless interface.

31. The method of claim 30 where exchanging transaction messages comprises:
receiving a message at the electronic merchant device from the portable device indicating whether to include wireless capability and indicating customer preference on the overall transaction process including payment application selection, coupon selection, receipt delivery.

32. The method of claim 29 where exchanging transaction messages comprises:
receiving a message from the portable device to the electronic merchant device including a voucher to be redeemed upon checkout.

33. The method of claim 29 where exchanging transaction messages comprises:
sending a message from the electronic merchant device to the portable device to write or update a voucher at installation or after redemption.

34. The method of claim 29 where the transaction information includes symmetric and/or public key exchange information and with establishing a persistent, secure wireless connection further comprising:
using the symmetric and/or public key exchange information to perform authenticated and encrypted communication between the portable device and the electronic merchant device over the wireless network.

35. A portable device comprising:
a processor;
a contactless interface;
a wireless network interface;
and
a memory in communication with the processor, the memory storing program instructions, the processor operative with the program instructions to:
exchange, using the contactless interface included in the portable device, transaction information associated with an electronic merchant device when the portable device is brought in close proximity to a contactless interface associated with the electronic merchant device, with the transaction information identifying the electronic merchant device and identifying a handover wireless connection between the portable device and the electronic merchant device and with the transaction information including customer preference and decision criteria for setting up a secure connection and security credentials required to form a secure connection;
establish a persistent, secure wireless connection, using the wireless network interface and the transaction information, between the portable device and the electronic merchant device;
exchange transaction messages between the portable device and the electronic merchant device over the persistent, secure wireless connection during a shopping interval;
the exchange of transaction information step, the establish a persistent connection step, and the exchange of transaction messages step each performed after utilizing a single bidirectional wireless transmission to setup the persistent connection between the portable device contactless interface and the electronic merchant device for a duration of the shopping interval;

maintain the persistent, secure wireless connection during the shopping interval as the customer moves about the merchant's facility; and close the wireless connection at the end of the shopping interval.

36. A portable device comprising:

a processor;

a contactless interface;

a wireless network interface; and a memory in communication with the processor, the memory storing program instructions, the processor operative with the program instructions to:

read, using the contactless interface included in the portable device, transaction information associated with an electronic merchant device when the portable device is brought in close proximity to a contactless tag device associated with the electronic merchant device, where the electronic merchant device does not include a contactless interface, with the transaction information identifying the electronic merchant device and identifying a handover wireless connection between the portable device and the electronic merchant device and with the transaction information including customer preference and decision criteria for setting up a secure connection and security credentials required to form a secure connection;

establish a persistent, secure wireless connection, using the wireless network interface and the transaction information, between the portable device and the electronic merchant device;

exchange transaction messages between the portable device and the electronic merchant device over the persistent, secure wireless connection during a shopping interval;

the read transaction information step, the establish a persistent connection step, and the exchange transaction messages step each performed after utilizing a single bidirectional wireless transmission to setup the persistent connection between the portable device contactless interface and the electronic merchant device for a duration of the shopping interval;

maintain the persistent, secure wireless connection during the shopping interval as the customer moves about the merchant's facility; and close the wireless connection at the end of the shopping interval.

\* \* \* \* \*